United States Patent
Chiu et al.

(10) Patent No.: US 10,451,723 B2
(45) Date of Patent: Oct. 22, 2019

(54) SIGNAL PROCESSING APPARATUS OF A CONTINUOUS-WAVE (CW) RADAR SENSING SYSTEM

(71) Applicant: National Chung-Shan Institute Of Science & Technology, Taoyuan (TW)

(72) Inventors: Jung-Min Chiu, Taoyuan (TW); Lih-Jye Tzou, Taoyuan (TW); Wen-Chih Liao, Taoyuan (TW)

(*) Notice: Subject to any disclaimer, the term of this patent is extended or adjusted under 35 U.S.C. 154(b) by 259 days.

(21) Appl. No.: 15/385,509

(22) Filed: Dec. 20, 2016

(65) Prior Publication Data

US 2018/0172816 A1   Jun. 21, 2018

(51) Int. Cl.
| | | |
|---|---|---|
| G01S 13/58 | (2006.01) | |
| G01S 13/34 | (2006.01) | |
| G01S 7/35 | (2006.01) | |
| G01S 7/292 | (2006.01) | |
| G01S 7/41 | (2006.01) | |
| G01S 13/26 | (2006.01) | |

(Continued)

(52) U.S. Cl.
CPC ............ *G01S 13/584* (2013.01); *G01S 7/292* (2013.01); *G01S 7/354* (2013.01); *G01S 7/414* (2013.01); *G01S 13/26* (2013.01); *G01S 13/343* (2013.01); *G01S 13/582* (2013.01); *G01S 13/931* (2013.01); *G01S 13/9307* (2013.01); *G01S 2007/2883* (2013.01); *G01S 2007/356* (2013.01)

(58) Field of Classification Search
CPC ................. G01S 13/343; G01S 13/584; G01S 2007/356; G01S 7/354; G01S 13/26; G01S 13/582; G01S 13/9307; G01S 13/931; G01S 2007/2883; G01S 7/292; G01S 7/414

USPC ......................................................... 342/112
See application file for complete search history.

(56) References Cited

U.S. PATENT DOCUMENTS 3,787,848 A * 1/1974 Laundry ............... G01S 13/524
                                                                342/162
3,903,525 A * 9/1975 Mullins ............... G01S 13/5242
                                                                342/161

(Continued)

FOREIGN PATENT DOCUMENTS

JP          2010-281689         * 12/2010

*Primary Examiner* — Timothy X Pham
(74) *Attorney, Agent, or Firm* — Sinorica, LLC

(57) ABSTRACT

The invention discloses a signal processing apparatus of a CW-radar sensing system, comprising of a transmitting unit, a transmitting antenna and a receiving device. The transmitting unit produces a first frequency conversion signal and a second frequency conversion signal which are transmitted by the transmitting antenna serially and alternatively. A receiving antenna respectively receives the echo signal of the first frequency conversion signal and the second frequency conversion signal, and a mixing-LPF (lowpass filtering) module mixes the echo signal with a first frequency conversion signal and a second frequency conversion signal which are produced by a local oscillator and carries out lowpass filtering for the signals as to obtain a beat frequency signal of the above signals. After the beat frequency signal is sampled and converted to a digital signal by an analog-digital converter (ADC), the range and movement speed and the like of the target against the signal processing apparatus of CW radar sensing system can be figured out by a digital signal processing module.

8 Claims, 3 Drawing Sheets

(51) Int. Cl.
*G01S 13/93* (2006.01)
*G01S 7/288* (2006.01)

(56) References Cited

U.S. PATENT DOCUMENTS

| | | | | |
|---|---|---|---|---|
| 4,816,833 | A * | 3/1989 | Ferguson | G01S 13/20 342/108 |
| 5,726,657 | A * | 3/1998 | Pergande | G01S 13/24 342/131 |
| 6,225,943 | B1 * | 5/2001 | Curley | G01S 13/227 342/137 |
| 2003/0117311 | A1 * | 6/2003 | Funai | G01S 13/26 342/26 R |
| 2006/0181448 | A1 * | 8/2006 | Natsume | G01S 7/36 342/70 |
| 2012/0146852 | A1 * | 6/2012 | Park | G01S 7/292 342/385 |
| 2014/0145871 | A1 * | 5/2014 | Asanuma | G01S 7/354 342/128 |
| 2015/0276929 | A1 * | 10/2015 | Li | G01S 13/931 342/112 |
| 2016/0327422 | A1 * | 11/2016 | Gluth | G01S 7/282 |
| 2017/0212213 | A1 * | 7/2017 | Kishigami | G01S 7/03 |

* cited by examiner

SIGNAL PROCESSING APPARATUS OF A CONTINUOUS-WAVE (CW) RADAR SENSING SYSTEM

FIELD OF THE INVENTION

The invention relates to a signal processing apparatus of a CW radar sensing system, especially to a signal processing apparatus of an alternating CW radar sensing system.

BACKGROUND OF THE INVENTION

Presently, radar for chasing or searching targets has been applied extensively. Technologies aiming at enhancing the accuracy of radar have been being provided in the relevant fields so as to increase the accuracy of tracking targets and reduce errors. Normally, radar can be classified into pulsed radar and continuous-wave radar which can further be classified into FMCW radar and Doppler radar.

It is known that the scanning wave of FMCW radar belongs to the low frequency type, and the FMCW radar adopts the low power and has low transmitting peak power so as to avoid danger caused by microwave radiation. Although FMCW dealing with one-time scanning radar-echo has a simple signal processing procedure, it has defects on detecting range against small target: The transmitting scanning time (Ts) of FMCW has to be prolonged to enhance the received SNR; and a MTI (moving target indication) filter is adopted in surroundings with clutter so as to filter the clutter caused by stable objects so as to improve the detection to moving targets; however, if the scanning time is too long, the PRF (pulse repetition frequency) is low and then the doppler clear region of MTI band-pass filter becomes so narrow that the enfoldment of Doppler becomes serious and the target can be filtered together with the clutter by the MTI when the speed of target is a little higher. So, the low PRF (about under 200 Hz) fits detection to low-speed targets and cannot be suitable for high-speed targets. The higher PRF (about 2 KHz) should be adopted to detect high-speed targets. But the high PRF also has its limits. When the PRF is high the Ts is short and the SNR of single scanning is deficient. And the multi-scanning has to be used to improve SNR. The fast fourier transform (FFT) integration is adopted to increase homology gain, which is named as FMCW Doppler processing, and the range against the target and the target speed can be acquired simultaneously. Although the high frequency scanning wave can be used to detect high-speed target, the low speed target can be easily filtered by MTI and the targets with speed differences cannot be detected at the same time.

With the shortage and imperfectness of existing technology, the detection to small targets becomes the trend of detecting radar. The capacity of detecting small targets should be fulfilled under extreme environment and atrocious weather. For the land radar, the sub clutter visibility is an important parameter. For the maritime radar, the compensation for the motion of the movable radar platform must be regarded. For the above reasons, the safety-protection radar faces the challenge of realizing the detection to small targets even in the environment with strong and complex clutter. So, the safety-protection radar not only should have perfect receiving sensitivity but also should have excellent capacity of distinguishing targets and clutter.

The detection to slow small targets by the low-power FMCW radar usually faces the following challenges: the radar cross-section (RCS) of small targets is less than and 1 m2 and is even 0.1 m2 and then the range detection becomes a challenge of low-power radars. For the running environment, whether on land or on the sea, the strength of background clutter is always above the RCS of small targets, and the detection to low-speed small target is so difficult that how to improve the sub clutter visibility of radars under the impact of clutter becomes the other challenge.

The invention discloses the signal processing apparatus of a CW-radar sensing system, being able to enhance range resolution rate, increase SNR, enlarge the detection range, obtain the target speed directly and raise the detection rate for the targets with a wide speed scope, so as to defeat the weakness of existing arts.

SUMMARY OF THE INVENTION

The invention discloses the signal processing apparatus of a CW-radar sensing system, adopting the alternative scanning means respectively with low PRF and high PRF to get the perfect detection against the small targets within wave dwell time.

The invention discloses a signal processing apparatus of a CW-radar sensing system, comprising of a transmitting unit composed of a sweep controller and a local oscillator, wherein the sweep controller controls the local oscillator to produce a first frequency conversion signal and a second frequency conversion signal; a transmitting antenna electrically connected with the local oscillator to transmit the first frequency conversion signal and the second frequency conversion signal serially and alternatively; a receiving device comprising of a receiving antenna, a mixing-LPF (lowpass filtering) module, an analog-digital converter and a digital signal processing module, wherein the receiving antenna respectively receives the echo signal of the first frequency conversion signal and the second frequency conversion signal, and the mixing-LPF (lowpass filtering) module mixes the echo signal with the first frequency conversion signal and the second frequency conversion signal which are produced by the local oscillator and carries out lowpass filtering for the signals so as to obtain a beat frequency signal which is sampled and converted to a digital signal by the analog-digital converter (ADC), and then the digital signal processing module figures out the range and movement speed and the like of the target against the signal processing apparatus of the CW radar sensing system.

Within an implement of the signal processing apparatus of the CW-radar sensing system, the first frequency conversion signal is a high-pulse repeated frequency signal and the second frequency conversion signal is a low-pulse repeated frequency signal.

Within an implement of the signal processing apparatus of the CW-radar sensing system, a plurality of the first frequency conversion signals and the second frequency conversion signals are produced during the antenna dwell-time.

Within an implement of the signal processing apparatus of the CW-radar sensing system, 80% dwell-time of the standing wave is occupied by the first frequency conversion signals and the second frequency conversion signals Within an implement of the signal processing apparatus of the CW-radar sensing system, the first frequency conversion signals occupy as much time as the second frequency conversion signals do.

Within an implement of the signal processing apparatus of the CW-radar sensing system, the frequency of the high-pulse repeated frequency signal is between 2 kHz and 4 kHz.

Within an implement of the signal processing apparatus of the CW-radar sensing system, the frequency of the low-pulse repeated frequency signal is less than 200 Hz.

Within an implement of the signal processing apparatus of the CW-radar sensing system, the apparatus further consists of a moving-target indicating filter, a Doppler signal processing module and a target judging unit, wherein the moving-target indicating filter is provided with a first corner turn memory to temporarily store the range information which is figured out by the digital signal processing module through fast fourier transform and further processed by the Doppler signal processing module through fast fourier transform when the pre-set amount of information is reached so as to transmit the two-dimensional information to the target judging unit which utilizes the information and adopts target detection logic to carry out detection and tracing against targets.

Within an implement of the signal processing apparatus of the CW-radar sensing system, a second corner turn memory is provided. When the pre-set amount of information of the first corner turn memory is reached, the data is processed. The range information figured out by the digital signal processing module through fast fourier transform can be stored in the second corner turn memory during the process of data processing so as to reduce time cost by data processing through the alternative application of the first corner turn memory and the second corner turn memory.

Within an implement of the signal processing apparatus of the CW-radar sensing system, the first frequency conversion signal and the second frequency conversion signal are sawtooth waves.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

The invention mainly provides a kind of signal processing apparatus of the CW-radar sensing system, utilizing the continuous wave transmitted alternatively to settle the speed range detection of targets. The detailed description of embodiments will be introduced as below and figures are provided for description. Besides the detailed description, the invention also can be extensively applied to other embodiments, and any slight replacements, changes and equivalent changes are all included in the scope of the invention, and the standard scope relies on the following patent claims. A lot of specified details are provided in the description to make readers understand the invention well. Nevertheless, the invention also can be applied even without part or all of the specified details. In addition, the proverbial procedures or components are not included in the details in order to avoid the unnecessary limits to the invention. The similar or same components in the figures will be shown with the similar or same signals. What should be addressed is that the figures are just schematics and cannot represent the actual size or quantity of components. The irrelevant details are avoided to make the figures concise.

The invention mainly provides a kind of signal processing apparatus of the CW-radar sensing system, adopting the dual mode comprising of low PRF and high PRF, alternatively utilizing FMCW mode and Doppler mode, and making use of FMCW Doppler processing to enhance the effect of eliminating clutter and directly get the target speed and fitting the detection against the wide target speed-scope. The more FFT points can be settled by Doppler processing the wider the detected speed scope can be realized, and then problems caused by wide targets speed-scope can be solved.

Either FMCW mode or Doppler mode cannot perfectly deal with the detection to the targets moving with large speed differences, such as the high-speed target moving in air (unmanned plane) and the low-speed targets (pedestrians). The manner of adopting dual modes is a good strategy to settle the above problem as the FMCW mode can detect the low-speed targets by low scanning frequency to avoid the filtering by the MTI filter and the Doppler mode can detect targets of 2 kHz Doppler frequency by the scanning frequency above 2 kHz to avoid the mixing of targets.

Figure 1:
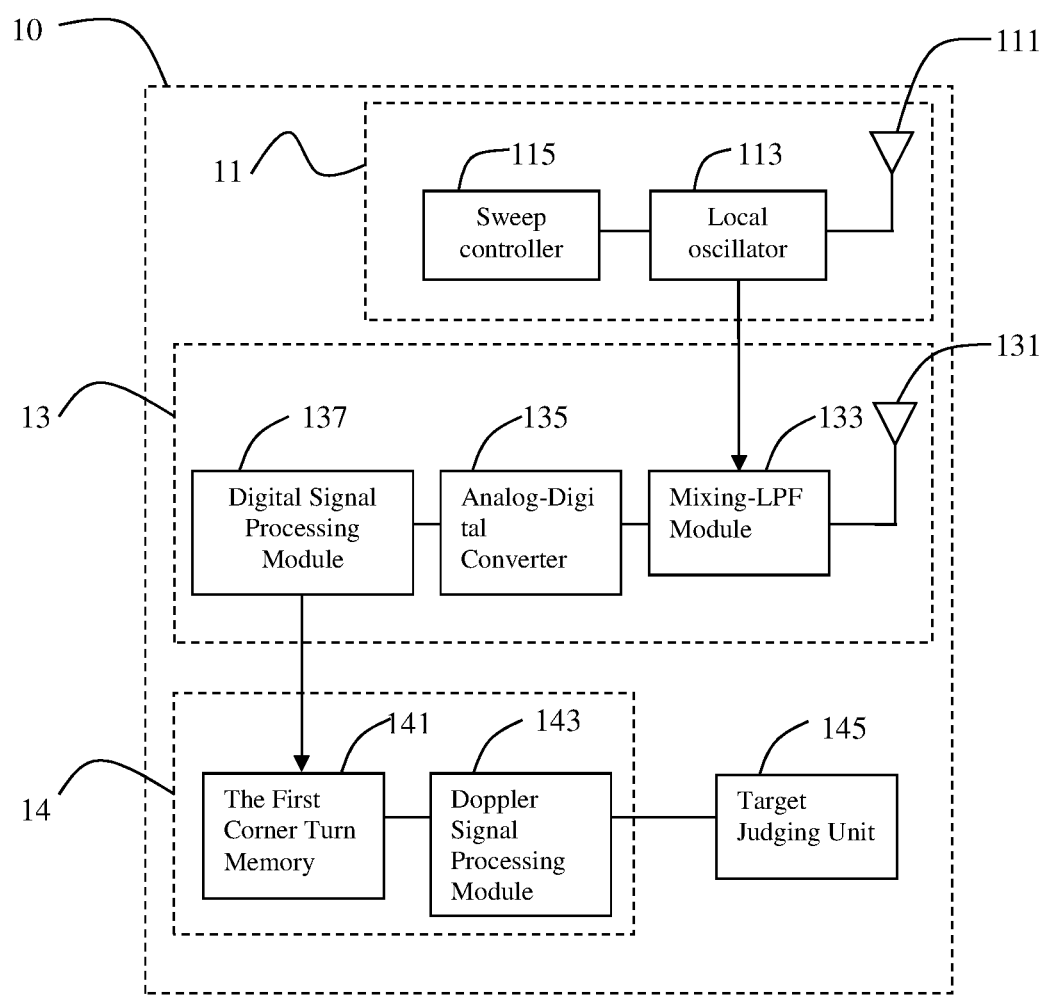
FIG. 1 is a diagram of an embodiment of the signal processing apparatus of the CW-radar sensing system.

As FIG. 1 shows, it is the diagram of signal processing apparatus 10 of the CW-radar sensing system, comprising of a transmitting unit 11 and a receiving unit 13. The transmitting unit 11 is composed of a transmitting antenna 111, a local oscillator 113 and a sweep controller 115. The receiving unit 13 consists of a receiving antenna 131, a mixing-LPF (lowpass filtering) module 133, an analog-digital converter 135 and a digital signal processing module 137. The running of the signal processing apparatus 10 of the CW-radar sensing system is as following: the sweep controller 115 controls the local oscillator 113 to produce the frequency modulated continuous wave (FMCW) and other kinds of FMCW which are transmitted by the transmitting antenna 111; correspondingly, after the echo signals reflected by targets are received by the receiving antenna 131 the mixing-LPF (lowpass filtering) module 133 mixes the echo signals with the sine signals produced by the local oscillator 113 and carries out lowpass filtering for the signals so as to obtain the beat frequency signal which is sampled and converted to a digital signal by the analog-digital converter 135, and then the digital signal processing module 137 figures out the range and movement speed and the like of the target against the signal processing apparatus 10 of the CW radar sensing system.

In order to figure out the range and speed of the target, the digital signal processing module 137 is adopted to convert the beat frequency of time domain to frequency domain by the way of fast fourier transform and the like. However, for the reduction of spectral leakage, the sampled beat frequency can be multiplied with window function in time domain by the digital signal processing module 137 before the fast fourier transform so as to avoid the mutual interruption between target echo waves, the reduction of SNR and the impact on capacity of the signal processing apparatus 10 of the CW radar sensing system. After the window function multiplication and fast fourier transform, the beat frequency is figured out by the digital signal processing module 137 through a static or dynamic threshold, for example, the range against targets and targets relative speed can be obtained by making use of the beat frequency of two or a few of chirp time, or of a beat frequency and other phase information according to the pattern differences.

From above it can be known that the digital signal processing module 137 utilizes window function, fast fourier transform and beat frequency detection to get the information as range against targets and target relative speed. But the resolving power is constricted by beat frequency's band-width in frequency domain during the spectral analysis carried out by the digital signal processing module 137 in limited time. The range resolution of the signal processing apparatus 10 of the CW radar sensing system depends on the band-width of the sweep controller 115, and the velocity resolution of the signal processing apparatus 10 of the CW radar sensing system relies on the starting frequency (f0) and modulating time (Tm) of the sweep controller 115.

The signal processing apparatus 10 of the CW radar sensing system further includes a moving target indication filter (MTIF) 14 for the detection to the moving small targets. The MTIF 14 is composed of a first corner turn memory (CTM) 139 which can temporarily store the range information figured out by the digital signal processing module 137 through fast fourier transform, and the range information stored in the first corner turn memory (CTM) 141 is further processed by the Doppler signal processing module 143 through fast fourier transform when the pre-set amount of information is reached so as to transmit the two-dimensional information to the target judging unit 145 utilizing the information and adopting the target detection logic to carry out detection and tracing against targets.

The radar detecting slow-speed small targets (RCS is about 0.1 to 1 m2 and the speed is about 0.3 to 30 m/sec) should be highly sensitive. With fixed peak transmitting power, prolonging the dwell time is good for enhancing the SNR and improving range detection. The traditional FMCW radar adopts the one-dimensional FFT processing to compress range so as to get relevant information but cannot get the target speed. The longer the Ts is the longer the pulse repetition intervals (PRI) becomes, and the transmission gain becomes larger when the sampling points increases and the FFT points rises, and the range detection capacity can be enhanced when the SNR detection is improved. If Ts and PRI are shortened and the Tot is kept still, many scanning wave modes can be obtained so as to carry out two-dimensional Doppler process to get the target speed. And the two-dimensional Doppler process is provided with homology integral gain and the range detection capacity can be maintained or enhanced. Under the strong and complicated clutter surrounding radars, the intensity of clutter is stronger than that of targets by 100 to 1000 m2, and then then resolution rate can be raised by enhancing transmitting band-width as the clutter power becomes lower when the range element becomes smaller so as to improve S/C and subclutter visibility (SCV), and enhance the detection to low-speed small targets.

Figure 2:
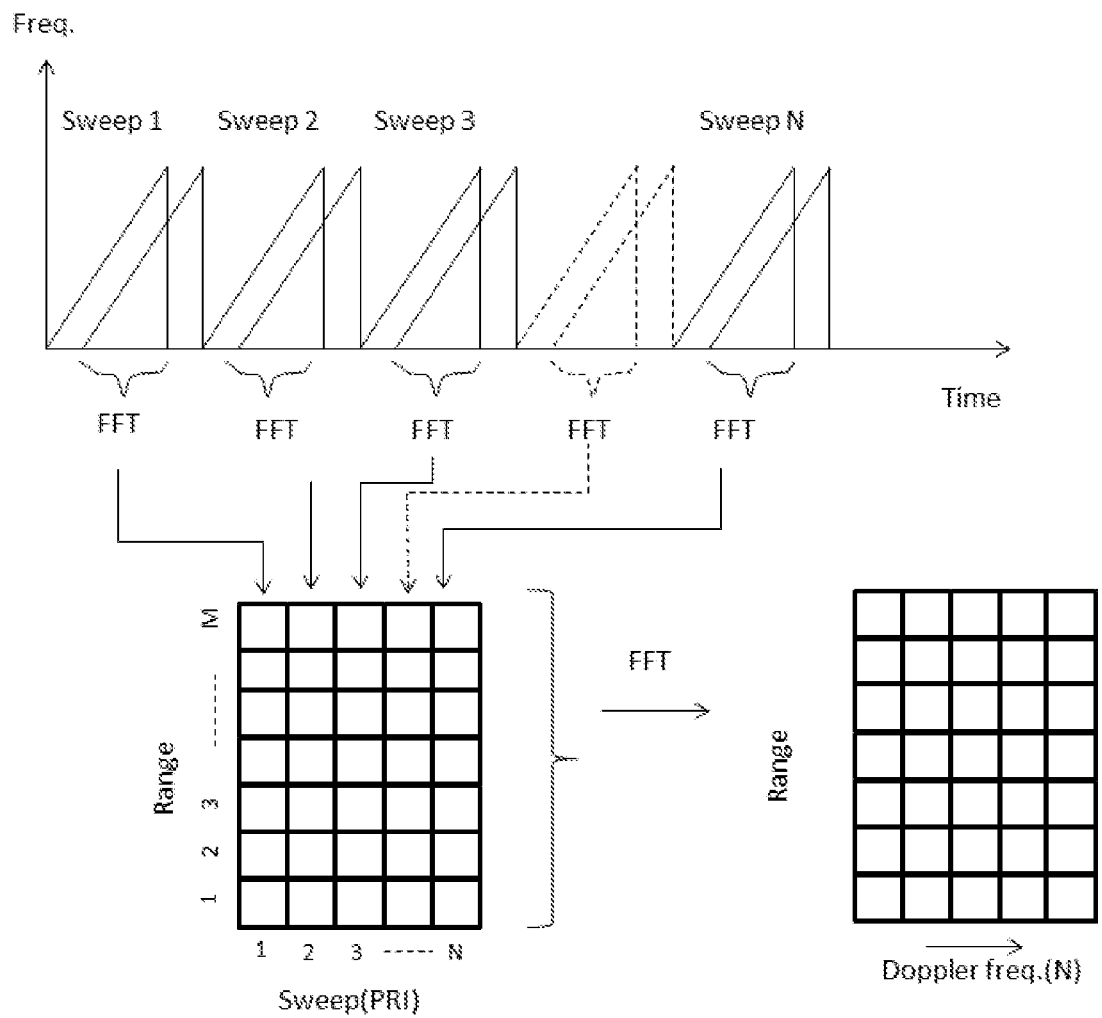
FIG. 2 is a Doppler calculation diagram of an embodiment of the signal processing apparatus of the CW-radar sensing system.

During the dwell time, a number of FMCW sawtooth waves are transmitted by the signal processing apparatus 10 of the CW radar sensing system. Within the first sawtooth wave, the beat frequency of the receiving unit 13 is output and transformed digitally for FFT calculation, and the calculated result is range data to be stored in memory. According to the manner above, as FIG. 2 shows, the FFT outputs of the second, the third and the fourth sawtooth waves are sequenced and stored in the first Corner Turn Memory 141, and the range data is stored from bottom to top and the same range-gate data is fetched horizontally for FFT calculation, so the memory is named as corner turn memory. Each range-gate data is dealt with FFT calculation and the output is two-dimensional range-Doppler map.

For the signal processing apparatus 10 of the CW radar sensing system, the sweep controller 115 controls the local oscillator 113 to produce a plurality of frequency signals during the dwell time. The frequency signals includes the first frequency conversion signals and the second frequency conversion signals, and the first frequency conversion signal is high-pulse repetition rate signal and the second frequency conversion signal is low-pulse repetition rate signal. In the embodiment, a plurality of the first frequency conversion signals and the second frequency conversion signals are included; and the first frequency conversion signals and the second frequency conversion signals are sawtooth waves. In order to reserve data calculation time, the first frequency conversion signals and the second frequency conversion signals occupy 60% to 80% of dwell time and the 80% is the best one. Within the dwell time, the first frequency conversion signals and the second frequency conversion signals respectively occupy the same time. In the embodiment, the frequency of the high-pulse repetition rate signal is between 2 kHz and 4 kHz and the frequency of the low-pulse repetition rate signal is less than 200 Hz. As FIG. 2 shows, a plurality of high-pulse repetition rate signals can be produced firstly or secondly and a plurality of low-pulse repetition rate signals also can be produced firstly or secondly.

The FMCW anti-collision radar usually adopts low-speed scanning (PRF is 10 Hz or less than 100 Hz), and its Ts is long (about 10 ms) and the filter BW is narrow, so the range resolution is high. The accurate target range and speed can be figured out by up sweep and down sweep. When the target RCS is less than the clutter of the same range gate, the target will be shielded by clutter and the MTI is designed to filter clutter, but the moving target with lower speed can also be filtered by MTI. The low PRF is usually adopted to avoid the filtering of low-speed moving targets. The moving targets with speed under 0.1 PRF will be filtered.

As the above mentions, the receiving unit 13 consists of a receiving antenna 131, a mixing-LPF (lowpass filtering) module 133, an analog-digital converter 135 and a digital signal processing module 137. The echo signals produced by the first frequency conversion signals and the second frequency conversion signals are received by the receiving antenna 131, and the mixing-LPF (lowpass filtering) module 133 mixes the echo signals with the first frequency conversion signals and the second frequency conversion signals produced by the local oscillator 113 and carries out lowpass filtering for the signals so as to obtain the beat frequency signal which is sampled and converted to a digital signal by the analog-digital converter 135, and then the digital signal processing module 137 figures out the range and movement speed and the like of the target against the signal processing apparatus 10 of the CW radar sensing system, and then the Doppler signal processing module 143 carries out two-dimensional range calculation, and eventually the target judging unit 145 carries out target detection and tracing.

Figure 3:
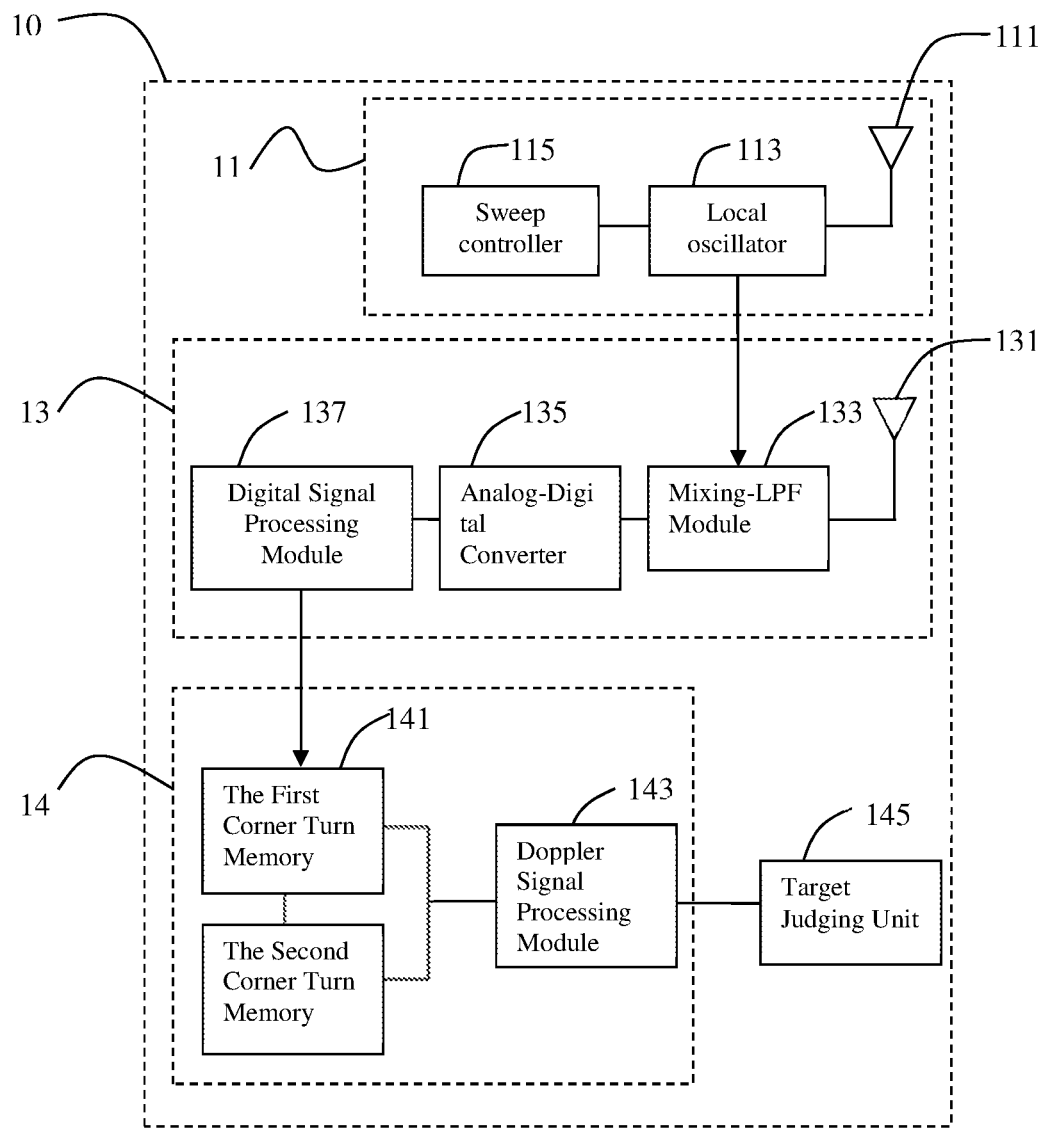
FIG. 3 is a diagram indicating that an embodiment of the signal processing apparatus of the CW-radar sensing system is provided with the second corner turn memory.

In the other embodiment, as FIG. 3 shows, the moving target indication filter 14 also consists of the second corner turn memory 142 for data management when the preset information amount of the first corner turn memory 141 is reached. During data management, the range data obtained through fast fourier transform by the digital signal processing module 137 can be stored in the second corner turn memory 142, and time cost by data management can be saved through the alternative application of the first corner turn memory 141 and the second corner turn memory 142.

The traditional FMCW radar adopts the one-dimensional FFT processing to compress range so as to get range information without obtaining the target speed. The longer the Ts is (PRI is also longer) the more sampling point becomes, and the transmission gain becomes larger when the FFT point increases, and the range detection capacity can be enhanced when the SNR detection is improved. If Ts and PRI are shortened and the Tot is kept still, many scanning wave modes can be obtained so as to carry out two-dimensional Doppler process to get the target speed. And the two-dimensional Doppler process is provided with homology integral gain and the range detection capacity can be maintained or enhanced.

The invention has the advantages of traditional FMCW radars, not only having low peak power and excellent range resolution rate. The low peak power has low energy consumption and the electromagnetic radiation to operators can be eliminated. The FMCW Doppler processing manner can enhance the clutter elimination effect and obtain the target speed directly. Moving targets with large speed differences can be detected, and the more the FFT point processed by Doppler is the wider the detected speed scope becomes. The integration between FMCW and Doppler processing can eliminate the clutter and realize the aim of detecting the low-speed moving targets. Doppler processing also can increase SNR so as to improve the range detection and get the target speed.

The signal processing apparatus of the CW radar sensing system adopts dual modes, alternatively utilizing the FMCW mode and Doppler processing mode to settle the difficulty of detecting targets with large speed differences. The alternative application can be carried out either in dwell time or during scanning period. Either FMCW mode or Doppler processing mode cannot perfectly deal with the detection to the targets moving with large speed differences, such as the high-speed target moving in air (unmanned plane) and the low-speed targets (pedestrians). The FMCW mode can detect the low-speed targets by low scanning frequency to avoid the filtering by the MTI filter, and the Doppler mode can detect targets of 2 kHz Doppler frequency by the scanning frequency above 2 kHz to avoid the mixing of targets. Enhancing the band-width of FMCW transmitting wave can improve range resolution rate and S/C so as to raise target-detection capacity of the radar surrounded by clutter.

The present invention is disclosed by the preferred embodiment in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A signal processing apparatus of a CW-radar sensing system comprising: a transmitting unit composed of a sweep controller and a local oscillator, wherein the sweep controller controls the local oscillator to produce a first frequency conversion signal and a second frequency conversion signal; a transmitting antenna electrically connected with the local oscillator to transmit the first frequency conversion signal and the second frequency conversion signal serially and alternatively; a receiving device comprising of a receiving antenna, a mixing-LPF (lowpass filtering) module, an analog-digital converter and a digital signal processing module, wherein the receiving antenna respectively receives the echo signal of the first frequency conversion signal and the second frequency conversion signal, and the mixing-LPF (lowpass filtering) module mixes the echo signal with the first frequency conversion signal and the second frequency conversion signal which are produced by the local oscillator and carries out lowpass filtering for the signals so as to obtain a beat frequency signal which is sampled and converted to a digital signal by the analog-digital converter (ADC), and then the digital signal processing module figures out the range and movement speed and the like of the target against the signal processing apparatus of the CW radar sensing system; a moving-target indicating filter, a Doppler signal processing module and a target judging unit, wherein the moving-target indicating filter is provided with a first corner turn memory and a second corner turn memory to temporarily store the range information which is figured out by the digital signal processing module through fast Fourier transform and further processed by the Doppler signal processing module through fast Fourier transform when the pre-set amount of information is reached so as to transmit the two-dimensional information to the target judging unit which utilizes the information and adopts target detection logic to carry out detection and tracing against targets with the second corner turn memory to reduce time cost by data processing through the alternative application of the first corner turn memory and the second corner turn memory.

2. The signal processing apparatus of a CW-radar sensing system according to claim 1, wherein the first frequency conversion signal is a high-pulse repeated frequency signal and the second frequency conversion signal is a low-pulse repeated frequency signal.

3. The signal processing apparatus of a CW-radar sensing system according to claim 2, wherein the frequency of the high-pulse repeated frequency signal is between 2 kHz and 4 kHz.

4. The signal processing apparatus of a CW-radar sensing system according to claim 2, wherein the frequency of the low-pulse repeated frequency signal is less than 200 Hz.

5. The signal processing apparatus of a CW-radar sensing system according to claim 1, wherein a plurality of the first frequency conversion signals and the second frequency conversion signals are produced during the antenna dwell-time.

6. The signal processing apparatus of a CW-radar sensing system according to claim 5, wherein 80% dwell-time of the standing wave is occupied by the first frequency conversion signals and the second frequency conversion signals.

7. The signal processing apparatus of a CW-radar sensing system according to claim 5, wherein the first frequency conversion signals occupy as much time as the second frequency conversion signals do.

8. The signal processing apparatus of a CW-radar sensing system according to claim 1, wherein the first frequency conversion signal and the second frequency conversion signal are sawtooth waves.

* * * * *